(12) United States Patent
Patel

(10) Patent No.: US 8,792,641 B2
(45) Date of Patent: *Jul. 29, 2014

(54) SECURE WIRELESS COMMUNICATION

(71) Applicant: Alcatel-Lucent, Paris (FR)

(72) Inventor: Sarvar Patel, Murray Hill, NJ (US)

(73) Assignee: Alcatel Lucent, Paris (FR)

(*) Notice: Subject to any disclaimer, the term of this patent is extended or adjusted under 35 U.S.C. 154(b) by 0 days.

This patent is subject to a terminal disclaimer.

(21) Appl. No.: 13/738,385

(22) Filed: Jan. 10, 2013

(65) Prior Publication Data

US 2013/0129093 A1    May 23, 2013

Related U.S. Application Data

(62) Division of application No. 12/285,336, filed on Oct. 2, 2008, now Pat. No. 8,379,854.

(60) Provisional application No. 60/998,125, filed on Oct. 9, 2007.

(51) Int. Cl.
*H04K 1/00*    (2006.01)

(52) U.S. Cl.
USPC .......... 380/247; 380/239; 380/277; 713/152; 713/161; 713/169; 713/182; 726/5; 726/26; 455/411

(58) Field of Classification Search
None
See application file for complete search history.

(56) References Cited

U.S. PATENT DOCUMENTS

| | | | |
|---|---|---|---|
| 6,918,035 B1* | 7/2005 | Patel | 713/169 |
| 2006/0046690 A1* | 3/2006 | Rose et al. | 455/410 |
| 2007/0157022 A1 | 7/2007 | Blom et al. | |
| 2007/0173229 A1* | 7/2007 | Dong et al. | 455/411 |

FOREIGN PATENT DOCUMENTS

| | | |
|---|---|---|
| JP | 2002232418 A | 8/2002 |
| JP | 2007506391 A | 3/2007 |
| JP | 2007508614 A | 4/2007 |
| JP | 2007527652 A | 9/2007 |
| JP | 2010538533 A | 12/2010 |
| JP | 2010541472 A | 12/2010 |
| KR | 10-0593576 | 6/2006 |
| KR | 20070053796 A | 5/2007 |
| WO | WO-2006029051 A1 | 3/2006 |

OTHER PUBLICATIONS

"Cave-Based 2G IMS security" 3GPP2, Mar. 2007, pp. 1-11.*
Keonwoo Kim et al., "Application of ESA in the Cave Mode Authentication," Roceedings of World Academy of Science, Engineering and Technology, [Online] vol. 18, Dec. 2006, pp. 92-96, XP 002521471 Retrieved from the Internet: <URL:http://www.waset.org/pwaset/v18/v18-18.pdf>> [retrieved on Mar. 26, 2009] Abstract Sections I and III.

(Continued)

*Primary Examiner* — Shewaye Gelagay

(74) *Attorney, Agent, or Firm* — Harness, Dickey & Pierce

(57) ABSTRACT

In one embodiment, the method performed by mobile equipment to authenticate communication with a network includes generating keys using cellular authentication and voice encryption, and then generating an authentication key based on these keys. The authentication key is used to generate an expected message authentication code used in authenticating the network according to authentication and key agreement security protocol.

20 Claims, 4 Drawing Sheets

(56) References Cited

OTHER PUBLICATIONS

3GPP2: "Multiple-Authentication and Legacy Authentication Support for Converged Access Network—3GPP2 X.S0054-102-0—Version 1.0," 3GPP2, [Online] Dec. 19, 2007, XP002521472 Retrieved from the Internet: <URL:http://www.3gpp2.org/public_html/specs/X.S0054-102-0_v1.0_071219.pdf>> [retrieved on Mar. 26, 2009] Section 4.

International Search Report and Written Opinion dated Apr. 14, 2009.

International Preliminary Search Report and Written Opinion dated Apr. 22, 2010.

Australian Notice of Acceptance, dated Aug. 11, 2011, for Application No. 2008311306.

Korean Notice of Preliminary Rejection dated Oct. 19, 2011 for Application No. 2010-7007647 and English translation therof.

J. S. Stach E. K. Park, Z. Su, "An Enhanced Authentication Protocol for Personal Communication Systems", 1998 IEEE Workshop on Application-Specific Software Engineering Technology (ASSET-98), [online], Mar. 26, 1998, pp. 128-132, [retrieved on Aug. 28, 2012]. Retrieved from the Internet, URL, <http://ieeexplore.ieee.org/stamp/stamp.jsp?arnumber=00688246>.

Keonwoo Kim, Dowon, Hong, and Kyoil Chung, "Application of ESA in the CAVE Mode Authentication", Proceedings of World Academy of Science, Engineering and Technology, [online], Dec. 2006, vol. 18, pp. 92-96 [retrieved on Sep. 4, 2012]. Retrieved from the Internet, URL, <citeseerx.ist.psu.edu/viewdoc/download;jsesionid=CCAFB2A4F7B1BDE3E3293E13D65D2-820?doi=10.1.1.193.4918&rep=rep1&type=pdf>.

Japanese Notice of Rejection for related Japanese Application No. 2010-528879 dated Sep. 11, 2012 (full translation provided).

\* cited by examiner

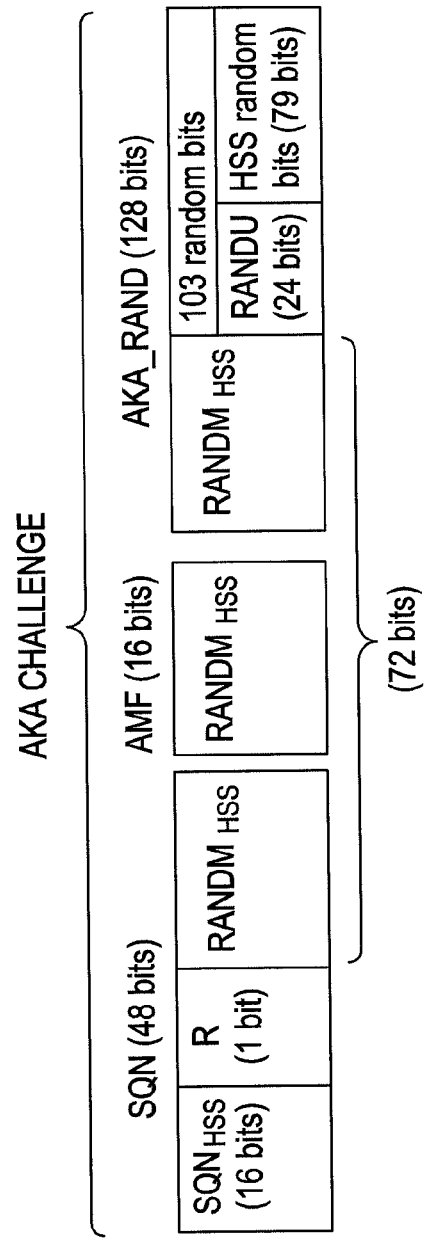

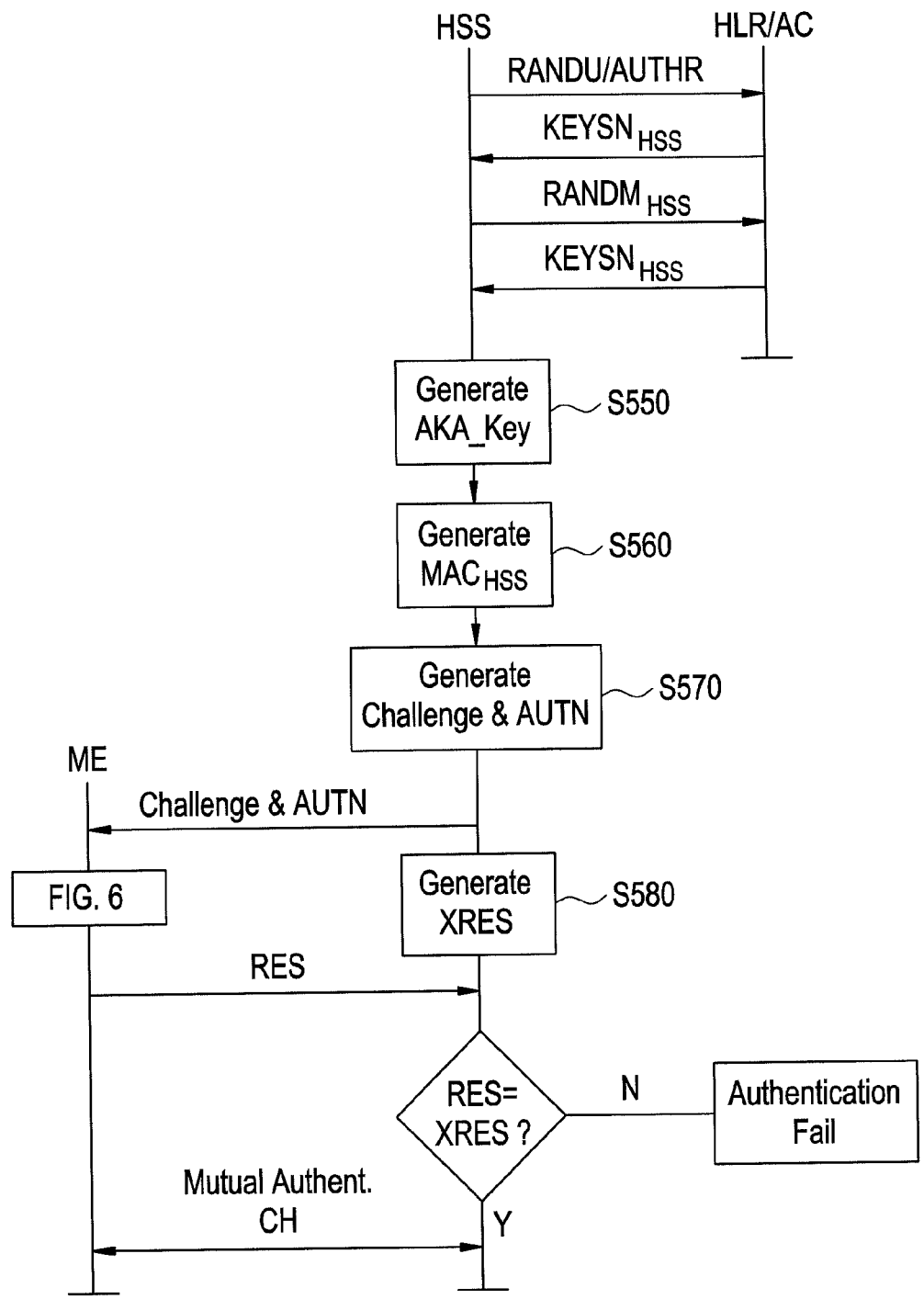

SECURE WIRELESS COMMUNICATION

PRIORITY STATEMENT

This application is a divisional of U.S. Pat. No. 8,379,854 filed Oct. 2, 2008 and claims the benefit of priority under 35 U.S.C. §119(e) to U.S. provisional application No. 60/998,125 filed Oct. 9, 2007, the contents of each of which is incorporated by reference in their entirety.

BACKGROUND

1. Field the of the Invention

The present invention relates to a method and system for secure wireless communications. In particular, the present invention relates to a method of establishing authentication keys at both the network and mobile equipment in order to establish a mutually authenticated communication channel.

2. Description of Related Art

Security methods and processes relating to wireless communications have evolved in recent years. In particular, 2G CDMA security evolved into 3G CDMA security.

As is well known in the art, 2G CDMA security involves cellular authentication and voice encryption (CAVE). In particular, 2G CDMA security uses at least a root key commonly referred to as an AKey and shared secret data (SSD) keys. The SSD keys are generated via a well-known SSD update procedure. The SSD keys are semi long term keys and are treated as root keys herein. The SSD keys may be shared with a Visitor Location Register (VLR) of a network if the VLR is the home serving system for a mobile equipment, for example. Further, conventional 2G CDMA security protocols may involve a global challenge and response procedure and a unique challenge and response procedure.

For the global challenge procedure, the network broadcasts a random challenge RAND to the mobile equipment. A mobile equipment performing system access (e.g. registration, call origination, and call termination) in a network that requires authentication, creates and sends an authentication response AUTHR using a long term key. The pair RAND/AUTHR is forwarded to the Home Location Register/Authentication Center (HLR/AC) for verification. Also for calls of type call origination, the last 6 digits are used in calculating AUTHR. For both call origination and call termination the mobile generates keys that are useful for the call (i.e., SMEKEY and PLCM). The HLR/AC also generates and returns to the VLR the SMEKEY and PLCM if the RAND/AUTHR pair verifies.

A unique challenge procedure can be performed by the network attempting to communicate with a mobile equipment at any time on either the control channel or traffic channel. For example, the VLR requests a unique challenge and expected response pair, RANDU and AUTHU from the HLR/AC. The network sends the RANDU to the mobile equipment and the mobile equipment calculates a response AUTHU using a long term key and sends a response AUTHU to the network. The network verifies the RANDU/AUTHU pair.

Conventional 3G CDMA security protocols are based on an authentication and key agreement (AKA) protocol and provide mutual authentication meaning (i) the mobile equipment authenticates the network and (ii) the network authenticates the mobile equipment before communications are performed. The well-known AKA security protocols used in 3G CDMA are based on quintuplets. Quintuplets include a random number RAND, expected response XRES, cipher key CK, integrity key 1K and network authentication token AUTN. A conventional network authentication token AUTN is based on a sequence number SQN, an anonymity key AK, authentication management field AMF and a message authentication code (MAC).

For example, the mobile equipment generates its own MAC based on a sequence number SQN stored in the mobile equipment, a secret key K stored in the mobile equipment, the AMF, and the random number RAND. Then, the MAC generated at the mobile equipment is compared with the MAC extracted from the network authentication token AUTN received from the serving system. Still further, the mobile equipment may determine if the sequence number SQN extracted from the network authentication token is an acceptable value. If the mobile equipment successfully authenticates the network, the mobile equipment prepares a response RES and transmits the response RES back to the serving system of the network. The serving system of the network then compares the expected response XRES with the response RES to authenticate the mobile equipment, thereby completing mutual authentication according to the conventional AKA security protocol.

If the mobile equipment during the authentication process determines the MAC, which was extracted from the network authentication token AUTN, does not match the MAC generated in the mobile equipment, the mobile equipment transmits a failure message to the serving system of the network. Further, if the mobile equipment, during the authentication process, determines the MAC value, which was extracted from the network authentication token AUTN matches the MAC value generated by the mobile equipment, but that the sequence number SQN is outside of the permissible range, the mobile equipment transmits a resynchronization message to the network. The AKA security protocol briefly described above and used in 3G CDMA is well known in the art and thus, further information is not provided herein for the sake of brevity.

While security protocols have evolved by transitioning from 2G CDMA security protocols to 3G CDMA security protocols, which are also implemented in some conventional IMS security protocols, some of the hardware equipment used for wireless communications has not been updated and/or is not capable of processing the more highly evolved protocols. For example, some companies which may have invested significant amounts of time, research and money in hardware used to process 2G CDMA security protocols have chosen not to update the hardware for various cost associated reasons. Therefore, some conventional 2G CDMA hardware devices are not currently capable of providing a mutually authenticated communication channel using the AKA security protocols of conventional 3G CDMA.

Accordingly, proposals have been made, which attempt to establish a mutually authenticated communication channel without using the quintuplet based AKA security protocol described above with respect to 3G CDMA. Stated differently, these proposals are attempting to use IS-41 authentication procedures previously used in 2G CDMA security protocols. However, all of these proposals suffer from at least the following deficiency. In particular, a compromise of a past IS-41 session key (e.g., SMEKEY and PLCM) would allow an attacker to replay a random number and successfully complete the key agreement protocol and communicate with a mobile equipment or a network. As such, these proposals are insecure when a previously used IS-41 session key is revealed.

SUMMARY

Example embodiments provide methods and apparatuses related to establishing communications between mobile equipment and a network that leverages ANSI-41 security protocols.

In one embodiment, the method performed by mobile equipment to authenticate communication with a network includes receiving authentication information from a network, and obtaining a first random number from the received authentication information. The first random number is a random number that the network associates with the mobile equipment. At least one mobile equipment key is generated based on the first random number using cellular authentication and voice encryption. A second random number is obtained from the received authentication information. The second random number is associated with the network. At least one network key is generated from the second random number using the cellular authentication and voice encryption. An authentication key is generated based on the mobile equipment key and the network key. An expected network message authentication code is generated based on the authentication key and at least a portion of the received authentication information according to authentication and key agreement security protocol. The network is authenticated based on the expected network message authentication code.

In another embodiment, a method performed by a network to establish the network with a mobile equipment includes generating a challenge. The challenge includes a sequence number field, an authentication management field, and a random number field. The sequence number field includes a sequence number and a portion of a first random number the network associates with the mobile equipment. The authentication management field includes another portion of the first random number, and the random number field includes a second random number and a further portion of the first random number. The embodiment further includes obtaining at least one mobile equipment key using the first random number, obtaining at least one network key using a second random number, and generating an authentication key based on the mobile equipment key and the network key. A first message authentication code is generated based on the authentication key according to authentication and key agreement security protocol, and an authentication token is generated based on the sequence number in the sequence number field, the authentication management field and the first message authentication code. The challenge and the authentication token are sent to the mobile equipment.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein:

FIG. 3 illustrates an example embodiment of a random number RANDM having a longer length than random numbers conventionally used in establishing communication channels.

FIG. 4 illustrates an example embodiment of an AKA challenge, which may be generated by a home subscriber server (HSS) and used by both a HSS and a mobile equipment in order to establish a mutually authenticated communication channel between the HSS 400 and mobile equipment.

FIG. 5 is a hybrid of a flowchart and signaling diagram illustrating an example embodiment of operations performed by and communications between the HSS, HLR/AC and mobile equipment to form a mutually authenticated communication channel.

DETAILED DESCRIPTION OF EXAMPLE EMBODIMENTS

Figure 1:
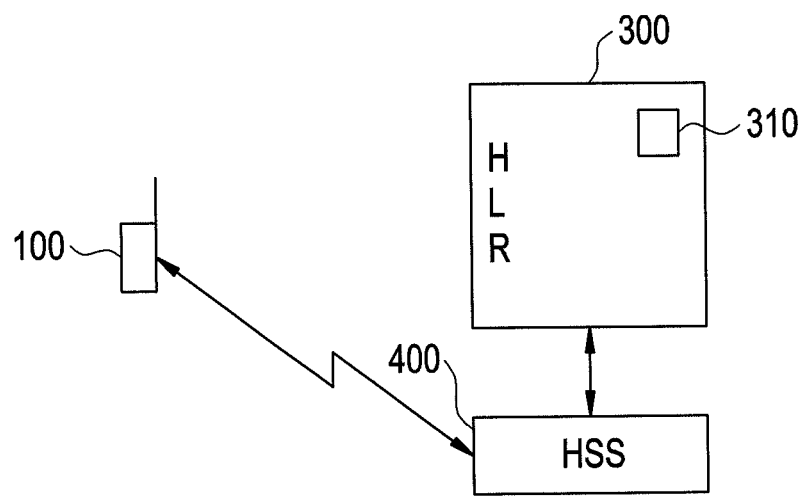
FIG. 1 illustrates a communication system according to an example embodiment.

FIG. 1 illustrates a communication system 10 including at least one mobile equipment (ME) 100 a home location register (HLR) 300 and a home subscribing server (HSS) 400. One skilled in the art will appreciate that the communication system 10 illustrated in FIG. 1 is simplified and would include various intermediary components used to communicate between the ME 100, the HLR/AC 300 and the HSS 400. The location of the ME 100, type of service requested by the ME 100, etc., may determine whether the HLR 300 or the HSS 400 provides a requested service to the ME 100.

According to the example embodiment as described with respect to FIG. 1, the HLR 300 includes an authentication center (AC) 310. One skilled in the art will appreciate the HLR 300 and the AC 310 may be separate and distinct components of the communication system instead of the AC 310 being included with the HLR 300 as shown in FIG. 1. In the remainder of this application the HLR 300 and authentication center 310 will be referred to collectively as a Location Register/Authentication Center (HLR/AC). The HLR/AC 300 includes functionality to perform well-known 2G CDMA security procedures such as cellular authentication and voice encryption (CAVE).

According to the example embodiment, HSS 400 may behave as a visiting location register (VLR) with respect to the HLR/AC 300, and leverage the 2G CMDA security functionality of the HLR/AC 300 to establish a mutually authenticated communication channel without having any AKA crypto-graphic keys agreed upon a priori with the ME 100.

Figure 2:
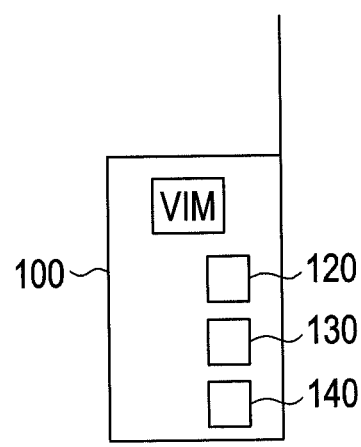
FIG. 2 illustrates an example embodiment of a mobile equipment.

FIG. 2 illustrates an example embodiment of ME 100. As shown in FIG. 2, the ME 100 includes a user identity module (UIM), a memory 120, a processor 130 and a transceiver 140. The UIM may be a conventional user identity module. Alternatively, one skilled in the art will appreciate the UIM of ME 100 could be a conventional removable user identity module (RUIM). For example, the UIM may be a module that was developed to function according to the 2G CDMA security protocols. As such, the UIM may store a MIN/IMSI/TMSI as is well known in the art and will not be discussed further herein for the sake of brevity.

The memory 120, the processor 130 and the transceiver 140 may be used in conjunction with the UIM to perform example embodiments of methods described below with respect to FIGS. 3 and 4. For ease of explanation, the memory 120, the processor 130 and the transceiver 140 are collectively referred to as ME in example embodiments described below.

FIG. 3 illustrates an example embodiment of a random number RANDM having a longer length than random numbers conventionally used in establishing communication channels. The ME 100 generates the random number RANDM. For example, generation of the random number RANDM is triggered upon insertion of a UIM into the ME 100 and/or in response to a signal received from the HSS 400. The random number RANDM shown in FIG. 3 includes 72 bits. In particular, the random number RANDM includes 20 random bits, 32 bits used in cellular authentication and voice encryption (CAVE), and 20 bits representing 6 call digits, for example. Hereafter, the random number RANDM generated by the ME 100 and stored in the ME is referred to as $RANDM_{ME}$, and the subscript ME indicates the random number is stored in the ME 100. This random number $RANDM_{ME}$ is communicated to the HSS 400, and stored at the HSS 400 as the $RANDM_{HSS}$.

FIG. 4 illustrates an example embodiment of an AKA challenge, which may be generated by the HSS 400 and used by both a HSS 400 and a ME 100 in order to establish a mutually authenticated communication channel between the HSS 400 and ME 100. As shown in FIG. 4, the AKA challenge includes the random number RANDM of the format shown in FIG. 3. However, because the random number RANDM included in the AKA challenge is a random number RANDM stored in the HSS 400, the random number is referred to as $RANDM_{HSS}$. Similarly, the random number RANDM stored in the ME is referred to as $RANDM_{ME}$. The AKA challenge provides increased security at least in part based on a random number RANDM having a longer length than random numbers conventionally used in establishing communication channels.

As shown in FIG. 4, the AKA challenge includes a sequence number (SQN) field, an authentication management field (AMF) and an authentication key agreement random number (AKA_RAND) field. At least a portion of each of the SQN field, AMF, and AKA_RAND field includes a number of bits of the $RANDM_{HSS}$ previously stored in the HSS 400 and used to generate the AKA challenge.

Referring to FIG. 4, the SQN field includes at least a portion of a sequence number stored in the HSS 400 ($SQN_{HSS}$), an indicator or flag (R), and a portion of the random number $RANDM_{HSS}$. In particular, the SQN field has a total of 48 bits including 16 bits of the $SQN_{HSS}$, 1 bit for the indicator, and 31 bits of the $RANDM_{HSS}$. The SQN field is one of the inputs to a function used to generate a message authentication code (MAC).

The indicator R of the SQN field is used by the HSS 400 in order to trigger the ME 100 to generate and store a new random number $RANDM_{ME}$. As previously indicated, the random number $RANDM_{ME}$ may be 72 bits. For example, if the indicator R is a "1", the ME 100 generates and stores a new random number $RANDM_{ME}$, whereas if the indicator is a "0" the ME 100 does not generate and store a new random number $RANDM_{ME}$.

Still referring to FIG. 4, the AMF includes 16 bits of the random number stored in the HSS 400 $RANDM_{HSS}$. The AMF is another one of the inputs to a function used to calculate a MAC.

The AKA_RAND field includes a portion of the random number $RANDM_{HSS}$ stored in the HSS 400, and random bits generated by the HSS 400. In particular, the AKA_RAND field includes 128 bits. The 128 bits of the AKA_RAND field includes 25 bits of the random number $RANDM_{HSS}$, a unique challenge RANDU including 24 bits and 79 other bits generated by the HSS 400.

Operations performed and communications involving the AKA challenge shown in FIG. 4 and/or information extracted from the AKA challenge are now described with respect to FIG. 5.

FIG. 5 is a hybrid of a flowchart and signaling diagram illustrating example embodiments of operations performed by and communications between the HSS 400, the HLR/AC 300 and the ME 100.

As shown, the As is well-known, the HSS 400 obtains the well-known random number pair RANDU/AUTHU in cooperation with the HLR/AC 300. The HSS 400 sends the RANDU/AUTHU pair as the well-known RANDU/AUTHR to the HLR/AC 300 to obtain the network keys $KEYSN_{HSS}$ such as SMEKEY and PLCM. Namely, the HSS 400 leverages the 2G CDMA security functionality of the HLR/AC 300. The HLR/AC 300 generates the network keys $KEYSN_{HSS}$ according to CAVE, and returns the network keys $KEYSN_{HSS}$ to the HSS 400.

Similarly, the HSS 400 sends the mobile random number $RANDM_{HSS}$ to the HLR/AC 300. As discussed above, the mobile random number $RANDM_{HSS}$ may have been previously received from the ME as $RANDM_{ME}$ and stored in the HSS 400 as the mobile random number $RANDM_{HSS}$. Namely, the mobile random number $RANDM_{HSS}$ is a random number that the network associates with the mobile equipment. The HLR/AC 300 performs the CAVE operation on the $RANDM_{HSS}$ to generate mobile equipment keys $KEYSM_{HSS}$ such as the SMEKEY and PLCM.

It may be that a mobile random number $RANDM_{HSS}$ is not available at the HSS 400; for example, the mobile random number $RANDM_{ME}$ was not previously received or has been deleted from the HSS 400. In this case, the network will create the random number $RANDM_{HSS}$. For example, the HSS 400 may create a second random number RANDN and use this second random number RANDN as the CAVE RAND portion (See FIG. 3) of the mobile random number $RANDM_{HSS}$ stored in the HSS 400. Further, the HSS 400 may generate random bits to be included in the random section of the mobile random number $RANDM_{HSS}$ stored in the HSS 400, as well as set the bits of the call digit section of the mobile random number $RANDM_{HSS}$ to all ones "1". It is noted that including all ones in the call digit section of the mobile random number $RANDM_{HSS}$ sent in a challenge could indicate to the ME information about the RANDN.

Returning to FIG. 5, in step S550, the HSS 400 generates an authentication key AKA_key. For example, the authentication key AKA_key may be a hash of the network keys $KEYSN_{HSS}$ and mobile $KEYSM_{HSS}$ as shown by the following equation: AKA_key=$H_1$ ($KEYSM_{HSS}$, $KEYSN_{HSS}$). In step S560, the HSS 400 uses the AKA_KEY according to 3G CMDA authentication and key agreement protocols along with the RANDU, the values of the AMF and the sequence number $SQN_{HSS}$ to generate a message authentication code $MAC_{HSS}$ that is stored in the HSS 400.

The HSS then generates the challenge of FIG. 4 and the authorization token AUTN in step S570. The authorization token AUTN is formed to include an anonymity key AK, the sequence number $SQN_{HSS}$, the authentication management field AMF and the message authentication code $MAC_{HSS}$. The challenge and authorization token AUTN are sent to the ME 100.

Figure 6:
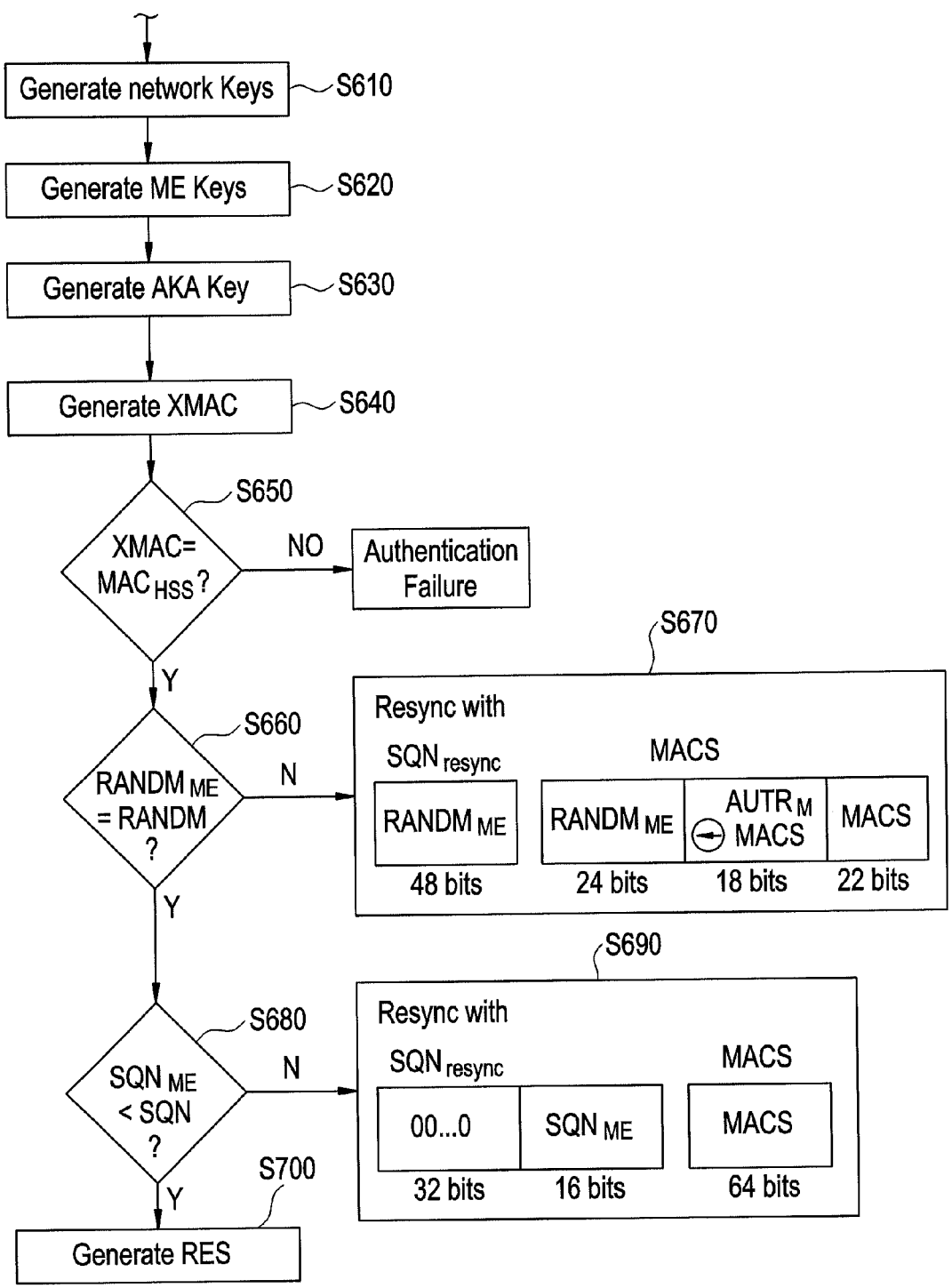
FIG. 6 is a flowchart illustrating example operation of the mobile equipment in authenticating the HSS.

FIG. 6 is a flowchart illustrating example operation of the mobile equipment in authenticating the HSS upon receipt of the challenge and authorization token AUTN. In particular, the transceiver 140 of the ME 100 receives the challenge and token from the HSS 400 and provides the information to the processor 130 for processing and/or memory 120 for storage.

As shown in FIG. 6, In step S610, the ME 100 extracts the RANDU from the AKA_RAND field of the received challenge, and the ME 100 may use the extracted random number RANDU to generate network keys $KEYSN_{ME}$ such as the PLCM and the SMEKEY. As previously mentioned, the generation of keys based on a random number is well-known in the art and may be readily performed by a UIM of the ME 100 using CAVE. It will be appreciated that the ME 100 and HLR/AC 300 generate the network keys KEYSN in the same fashion.

Further, the processor 130 of the ME extracts in step S620 the random number $RANDM_{HSS}$ from the received challenge, and the processor 130 generates the mobile keys $KEYSM_{ME}$.

Again, the ME 100 uses CAVE on the RANDM$_{HSS}$ to generate the mobile keys KEYSM$_{ME}$. Alternatively, the mobile keys KEYSM$_{ME}$ may have already been generated based on RANDM$_{ME}$ and stored in the memory 140 of the ME 100. For example, the processor 130 sets the 20 least significant bits as six dialed digits, next 32 least significant bits as a CAVE RAND and provides this information to the UIM in order to obtain a mobile authentication response AUTHM and the mobile keys KEYSM$_{ME}$.

Once both the network keys KEYSN$_{ME}$ and the mobile keys KEYSM$_{ME}$ are obtained by the ME 100, the ME 100 generates the authentication key AKA_key in step S630. For example, the authentication key AKA_key may be a hash of the network keys KEYSN$_{ME}$ and mobile KEYSM$_{ME}$ as shown by the following equation: AKA_key=H$_1$ (KEYSN$_{ME}$, KEYSN$_{ME}$).

In step S640, the ME 100 then generates the expected message authentication code XMAC. The expected message authentication code XMAC is generated by the ME 100 using the mobile random number RANDM$_{HSS}$ from the SQN portion of the AKA challenge and the authentication key AKA_key generated and stored in the ME 100 according to 3G CDMA authentication and key agreement security protocols.

The ME 100 then compares the expected message authentication code XMAC with the MACM$_{HSS}$ obtained from the authentication token AUTN in step S650. If the expected message authentication code XMAC and the MACM$_{HSS}$ associated with the HSS 400 do not match, the ME 100 sends an authentication failure to the HSS 400 as shown in FIG. 6, and the security protocol is aborted. Alternatively, if the expected message authentication code XMAC and the MACM$_{HSS}$ associated with the HSS 400 do match, the method shown in FIG. 6 proceeds to step S660.

In step S660, the ME 100 determines if the mobile random number RANDM$_{HSS}$ received from the HSS 400 in the AKA challenge matches the mobile random number RANDM$_{ME}$ stored in the ME 100. If the mobile random number RANDM$_{HSS}$ received from the HSS 400 does not match the mobile random number RANDM$_{ME}$ stored in the memory 140 of the ME 100, the ME 100 generates and sends a resynchronization message in step S670. As shown in FIG. 6, the resynchronization message includes a sequence number SQN$_{RESYNC}$ field and a MACS field.

According to an example embodiment, the resynchronization message includes the mobile random number RANDM$_{ME}$ stored in the ME 100. For example, in FIG. 6, the sequence number field includes 48 bits of the RANDM$_{ME}$ and the MACS field includes 24 bits of the mobile random number RANDM$_{ME}$. In addition, the MACS field includes 18 bits of a mobile authentication response AUTHRM that are XORed with 18 bits of the MACS, as well as 22 bits of the MACS. Generation of a mobile authentication response AUTHRM is well-known in the art and thus not discussed herein for the sake of brevity.

In response to receiving the resynchronization message, the HSS 400 generates a MACS$_{HSS}$ using the authentication key AKA_key in order to verify the ME 100. In particular, the HSS 400 performs a pseudo random function using the previously generated authentication key AKA_key, the mobile random number RANDM$_{HSS}$ stored in the HSS 400, and the random number AKA_RAND stored in the HSS 400.

The HSS 400 then compares the MACS$_{HSS}$ with the MACS received in the resynchronization message provided by the ME 100. For example, the HSS 400 may extract the 22 least significant bits of the MACS received in the resynchronization message and compare the extracted 22 bits with the 22 least significant bits of the MACS$_{HSS}$.

In addition, the HSS 400 extracts the mobile authentication response AUTHRM received from the ME 100 by XORing the next 18 bits of the MACS. According to an example embodiment, the HSS 400 then sends the AUTHRM along with additional information to the HLR/AC 300 to verify the ME 100 and obtain new mobile keys KEYSM$_{HSS}$. The additional information includes a CAVE RANDM$_{ME}$ and call digits, for example. If the mobile authentication response is verified by the HLR/AC 300, 18 bits of the MACS are also verified and thus, a total of 40 bits are verified.

Alternatively, if in step S660, the RANDM$_{HSS}$ is equal to the RANDM$_{ME}$, the method shown in FIG. 6 proceeds to step S680. In step S680, the ME 100 determines if the sequence number SQN is acceptable. The sequence number SQN associated with the current authentication process is compared to a sequence number SQN$_{ME}$ previously stored in the ME 100. For example, the sequence number SQN associated with the current authentication process should be greater than the sequence number SQN$_{ME}$ previously stored in the ME 100, but within a certain range. Stated differently, the sequence number SQN associated with the current authentication process should be greater than the sequence number SQN$_{ME}$ previously stored in the ME 100 and less than an upper limit of a permissible sequence number SQN$_{ME}$+Δ, i.e., SQNMD<SQN<SQNME+Δ, wherein Δ is an integer value.

If in step S680, the sequence number SQN is determined to be outside of a permissible range, the ME 100 sends a resynchronization message in step S690. As shown in FIG. 6, the resynchronization message includes a sequence number SQN$_{RESYNC}$ field and a MACS field. For example, the SQN$_{RESYNC}$ field of the resynchronization message may include zeroes for the 32 most significant bits of a 48 bit sequence number and the 16 least significant bits of the 48 bit sequence number may be set to a sequence number SQN$_{ME}$ previously stored in the ME 100. As previously discussed, the ME 100 generates an AKA_KEY based on the received challenge. The generated AKA_key is used to calculate a MACS, which is included in the MACS field of the resynchronization message.

The HSS 400 receives the resynchronization message generated because the sequence number SQN was determined to be outside of a permissible range. The HSS 400 processes the received resynchronization message. For example, the HSS 400 may be configured to recognize that the 32 most significant bits of the 48 bit sequence number included in the sequence resynchronization field SQN$_{RESYNC}$ being set to zeroes indicates that the resynchronization message includes a sequence number SQN$_{ME}$ stored in the ME 100. Accordingly, the HSS 400 stores the sequence number SQN$_{ME}$ for future use. However, the HSS 400 also verifies the ME 100 using the 64 bit MACS included in the MACS field as was discussed above.

If, in step S680, the ME 100 determines the sequence number SQN associated with the current authentication operation is within a permissible range, the ME 100 generates a response message RES in step S700. The generation of a response message RES based on a random number and a secret key stored in the ME is well known in the art and thus, is not discussed herein for the sake of brevity. The ME 100 also calculates a cipher key CK and integrity key IK based on the random number and the secret key. The calculation of a cipher key CK and integrity key IK is also well known in the art.

Returning to FIG. 5, the ME 100 sends the response message RES to the HSS 400. The HSS 400 will have already generated an expected response message XRES in step S580 in the well-known manner. In step S590, the HSS or a network entity on behalf of the HSS 400 compares the response message to the expected response message XRES. If no match exists, authentication fails. However, a match does exist, then in the HSS 400 and the ME 100 establish a mutually authenticated communication channel.

The methods and apparatuses and systems described above provide at least 64 bit security guarantees. Further, during challenge formation, the methods involve sending both the random number from the mobile equipment and the network. An authentication key agreement (AKA) key is based on CDMA keys from challenges. Still further, the mobile equipment regenerates a 72 bit random number associated with the mobile equipment only at UIM insertion and not during resynchronization. During resynchronization, either the 72 bit random number generated or stored in the mobile equipment is sent or a 16 bit sequence number is sent. The network verifies and accepts the resynchronization message and stores the 72 bit random number provided by the mobile equipment. Still further, when sending a challenge, the network uses a 72 bit random number the network associates with the mobile equipment and a newly created random number to create CDMA keys which in turn create an AKA key. The AKA key is used with standard AKA functions to create a MAC, RES, CK and IK.

The invention being thus described, it will be obvious that the same may be varied in many ways. Such variations are not to be regarded as a departure from the spirit and scope of the invention, and all such modifications as would be obvious to one skilled in the art are intended to be included within the scope of the present invention.

I claim:

1. A device, comprising:
a mobile equipment configured to,
receive authentication information from a network,
obtain a first random number from the received authentication information, the first random number being a random number that the mobile equipment had sent the network,
generate at least one mobile equipment key based on the first random number using cellular authentication and voice encryption,
obtain a second random number from the received authentication information, the second random number being associated with the network,
generate at least one network key from the second random number using the cellular authentication and voice encryption,
generate an authentication key that includes hashing together the mobile equipment key and the network key,
generate an expected network message authentication code based on the authentication key and at least a portion of the received authentication information according to authentication and key agreement security protocol, and
authenticate the network based on the expected network message authentication code.

2. The device of claim 1, wherein the device is further configured to,
obtain a message authentication code from the received authentication information, and
compare the expected message authentication code to the obtained message authentication code.

3. The device of claim 2, wherein the device is further configured to,
compare the first random number with a third random number stored in the mobile equipment, and
send a resynchronization message to the network if the first random number does not match the third random number.

4. The device of claim 3, wherein the resynchronization message includes at least a portion of the third random number.

5. The device of claim 2, wherein the received authentication information includes a sequence number field, an authentication management field, and an authentication key agreement random number field, the device being further configured to,
determine if a sequence number in the sequence number field is within a permissible range, and
send a resynchronization message if the sequence number is determined not to be within the permissible range.

6. The device of claim 5, wherein the resynchronization message includes a sequence number stored in the mobile equipment.

7. The device of claim 1, wherein the received authentication information includes a sequence number field, an authentication management field, and an authentication key agreement random number field, the device further configured to,
obtain a message authentication code from the received authentication information,
compare the expected message authentication code to the obtained message authentication code,
compare the first random number with a third random number stored in the mobile equipment, and
determine if a sequence number in the sequence number field is within a permissible range, and
send an authentication response to the network if the expected message authentication code matches the obtained message authentication code, the first random number matches the third random number, and the sequence number field is within the permissible range.

8. The device of claim 1, wherein,
the received authentication information includes a sequence number field, an authentication management field, and an authentication key agreement random number field, and
the first random number includes a portion of the sequence number field, the authentication management field and a portion of the authentication key agreement random number field.

9. The device of claim 8, wherein the first random number has a length of at least 64 bits.

10. A node, comprising:
a network node, configured to,
generate a challenge including a sequence number field, an authentication management field, and a random number field, the sequence number field including a sequence number and a portion of a first random number the network node had received from a mobile equipment, the authentication management field including another portion of the first random number, and the random number field includes a second random number and a further portion of the first random number,
obtain at least one mobile equipment key using the first random number,
obtain at least one network key using a second random number,
generate an authentication key that includes hashing together the mobile equipment key and the network key, generate a first message authentication code based on the authentication key according to authentication and key agreement security protocol, generate an authentication token based on the sequence number in the sequence number field, the authentication management field and the first message authentication code, and send the challenge and the authentication token to the mobile equipment.

11. The node of claim 10, further configured to, receive a response to the challenge and authentication token from the mobile equipment, and establish a mutually authenticated communication channel with the mobile equipment based on the response.

12. The node of claim 10, wherein the sequence number field includes a flag controlling whether the mobile equipment generates a new random number for use during authentication.

13. The node of claim 10, further configured to, receive a resynchronization message from the mobile equipment, the resynchronization message including a third random number and a second message authentication code.

14. The node of claim 13, wherein the second random number included in the resynchronization message has a length of at least 64 bits.

15. The node of claim 13, further configured to, verify the mobile equipment based on the second message authentication code, and store the second random number for generating another challenge for the mobile equipment if the mobile equipment is verified.

16. The node of claim 10, further configured to, receive a resynchronization message from the mobile equipment, the resynchronization message including a number of bits indicating the resynchronization message includes a sequence number associated with the mobile equipment, the resynchronization message further including the sequence number associated with the mobile equipment and a second message authentication code.

17. The node of claim 16, further configured to, verify the mobile equipment based on the second message authentication code, and store the sequence number associated with the mobile equipment for generating another challenge if the mobile equipment is verified.

18. The device of claim 1, wherein the authentication key is a 128-bit authentication and key agreement (AKA) protocol key.

19. The node of claim 10, wherein the authentication key is a 128-bit authentication and key agreement (AKA) protocol key.

20. A mobile device, comprising:

a memory;

a transceiver; and a processor, the mobile device being configured to, receive, by the transceiver, authentication information from a network, obtain, by the processor, a first random number from the received authentication information, transmit, by the transceiver, the first random number to the network, generate, by the processor, at least one mobile equipment key based on the first random number using cellular authentication and voice encryption, save the mobile equipment key to the memory, obtain, by the processor, a second random number from the received authentication information, the second random number being associated with the network, generate, by the processor, at least one network key from the second random number using the cellular authentication and the voice encryption, generate, by the processor, an authentication key that includes hashing together the mobile equipment key and the network key, generate, by the processor, an expected network message authenticatior code based on the authentication key and at least a portion of the received authentication information according to authentication and key agreement security protocol, save the expected network message authentication code to the memory, authenticate, by the processor, the network based on the expected network message authentication code.

* * * * *